US011093205B2

(12) United States Patent
Yoshihara

(10) Patent No.: US 11,093,205 B2
(45) Date of Patent: Aug. 17, 2021

(54) DISPLAY DEVICE INCLUDED IN A PLURALITY OF DISPLAY DEVICES DAISY-CHAINED VIA CONNECTORS, DISPLAY SYSTEM, AND CONTROL METHOD THEREOF

(71) Applicant: SEIKO EPSON CORPORATION, Tokyo (JP)

(72) Inventor: Masato Yoshihara, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/686,321

(22) Filed: Nov. 18, 2019

(65) Prior Publication Data
US 2020/0159483 A1  May 21, 2020

(30) Foreign Application Priority Data
Nov. 19, 2018  (JP) .............................. JP2018-216505

(51) Int. Cl.
*G06F 3/14* (2006.01)
*G09G 5/00* (2006.01)
*H04N 9/31* (2006.01)

(52) U.S. Cl.
CPC ........... *G06F 3/1446* (2013.01); *G09G 5/006* (2013.01); *H04N 9/3147* (2013.01); *G09G 2300/026* (2013.01)

(58) Field of Classification Search
CPC ...................................................... G06F 3/1446
USPC ........................................................... 345/1.1
See application file for complete search history.

(56) References Cited

U.S. PATENT DOCUMENTS

| | | | | |
|---|---|---|---|---|
| 2016/0139867 A1* | 5/2016 | Cha | ........................ | G06F 3/1415 348/383 |
| 2017/0214895 A1* | 7/2017 | Fujioka | ................ | H04N 9/3182 |
| 2018/0084234 A1* | 3/2018 | Yamamoto | ....... | H04N 21/43635 |

FOREIGN PATENT DOCUMENTS

| | | |
|---|---|---|
| JP | 2011-023412 A | 2/2011 |
| JP | 2012-060205 A | 3/2012 |
| JP | 2017-156414 A | 9/2017 |
| JP | 2018-117315 A | 7/2018 |

* cited by examiner

*Primary Examiner* — Long D Pham
(74) *Attorney, Agent, or Firm* — Oliff PLC

(57) ABSTRACT

There is provided a projector included in four projectors daisy-chain coupled via an input connector of an HDMI standard and an output connector of the HDMI standard, the projector including a projecting section, a detecting section configured to detect whether the output connector is coupled, and a deciding section configured to decide a first logical address as a logical address of the projector when the detecting section does not detect the coupling of the output connector and decide a second logical address as the logical address of the projector when the detecting section detects the coupling of the output connector.

13 Claims, 10 Drawing Sheets

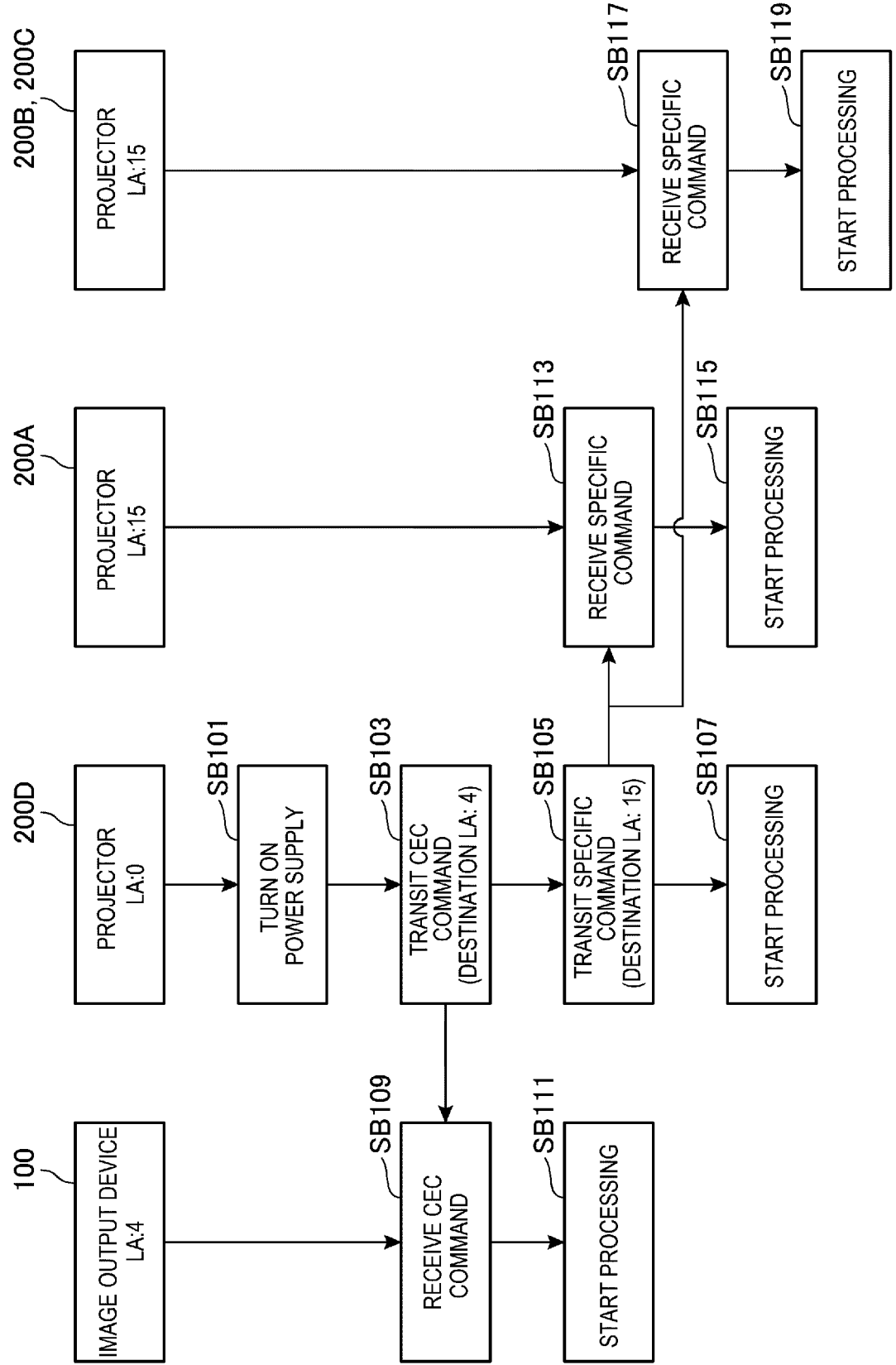

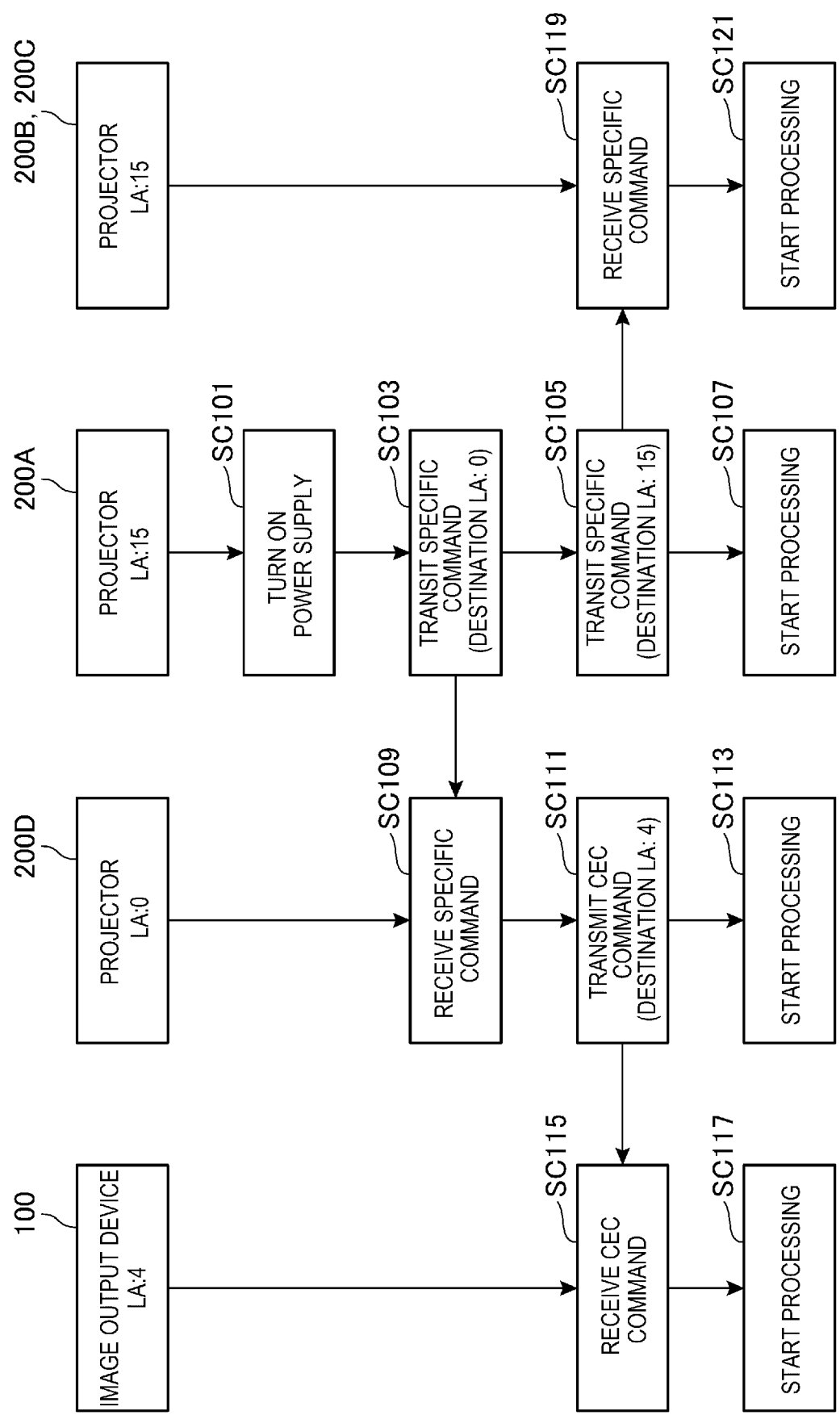

DISPLAY DEVICE INCLUDED IN A PLURALITY OF DISPLAY DEVICES DAISY-CHAINED VIA CONNECTORS, DISPLAY SYSTEM, AND CONTROL METHOD THEREOF

The present application is based on, and claims priority from JP Application Serial Number 2018-216505, filed Nov. 19, 2018, the disclosure of which is hereby incorporated by reference herein in its entirety.

BACKGROUND

1. Technical Field

The present disclosure relates to a display device, a display system, and a control method for the display device.

2. Related Art

There has been known a display system in which a plurality of display devices are coupled by a cable and images are displayed by the coupled plurality of display devices (see, for example, JP A-2011-234123 (Patent Literature 1)).

The display device described in Patent Literature 1 is coupled to each of a BD player, a HDD recorder, and a projector based on an HDMI standard. In the configuration described in Patent Literature 1, logical addresses are separately allocated to a plurality of sink devices according to the HDMI standard to enable the sink devices to be distinguished and systems for coupling the sink devices and source devices are separated. Therefore, the display device includes an association control section that confirms association between the sink devices and the source devices according to association information, causes the sink devices and the source devices to associate, and decides an output destination of video and sound data and a switching control section that establishes coupling between the sink devices and the source devices based on information indicating the output destination decided by the association control section.

In the display system described in Patent Literature 1, the association between the devices is complicated and throughput of information is sometimes deteriorated.

SUMMARY

An aspect of the present disclosure is directed to a display device included in a plurality of display devices daisy-chain coupled via an input connector of an HDMI standard and an output connector of the HDMI standard, the display device including: a display section; a detecting section configured to detect whether the output connector is coupled; and a deciding section configured to decide a logical address of the display device. The deciding section decides a first logical address as the logical address of the display device when the detecting section does not detect the coupling of the output connector. The deciding section decides a second logical address different from the first logical address as the logical address of the display device when the detecting section detects the coupling of the output connector.

In the display device, the display device may further include: a transmitting section configured to transmit polling having the first logical address as a destination when the detecting section does not detect the coupling of the output connector; and a determining section configured to determine whether an affirmative response to the polling is received. When the determining section determines that the affirmative response is received, the deciding section may decide the second logical address as the logical address of the display device.

In the display device, one of two display devices located at both ends in the plurality of display devices may be coupled to, via the input connector, an image output device that outputs image information. The display device may further include a first communication control section configured to communicate with the image output device using a CEC command when the logical address of the display device is the first logical address.

In the display device, when the logical address of the display device is the first logical address and the image output device receives start operation, the first communication control section may receive the CEC command for instructing a start from the image output device.

In the display device, when the logical address of the display device is the first logical address and the display device receives start operation, the first communication control section may transmit the CEC command for instructing a start to the image output device.

In the display device, the display device may further include a second communication control section configured to perform communication using a specific command for identifying a destination based on information other than the logical address. When the logical address of the display device is the second logical address, the second communication control section may communicate with another display device having the first logical address among the plurality of display devices.

In the display device, when the logical address of the display device is the second logical address, the second communication control section may communicate with another display device, a logical address of which is the second logical address, among the plurality of display devices using the specific command.

In the display device, when the logical address of the display device is the second logical address and the display device receives start operation, the second communication control section may transmit the specific command for instructing a start to another display device among the plurality of display devices.

In the display device, when the logical address of the display device is the first logical address and the display device receives start operation, the second communication control section may transmit the specific command for instructing a start to another display device, a logical address of which is the second logical address, among the plurality of display devices.

In the display device, when the logical address of the display device is the first logical address and the first communication control section receives the CEC command for instructing a start from the image output device, the second communication control section may transmit the specific command for instructing a start to another display device, a logical address of which is the second logical address, among the plurality of display devices.

In the display device, when the logical address of the display device is the first logical address and the second communication control section receives the specific command for instructing a start, the first communication control section may transmit the CEC command for instructing a start to the image output device.

In the display device, the display device may be a projector.

Another aspect of the present disclosure is directed to a display system including a plurality of display devices daisy-chain coupled via an input connector of an HDMI standard and an output connector of the HDMI standard. Each of the plurality of display devices includes: a display section; a detecting section configured to detect whether the output connector is coupled; and a deciding section configured to decide a logical address of the display device. The deciding section decides a first logical address as the logical address of the display device when the detecting section does not detect the coupling of the output connector. The deciding section decides a second logical address different from the first logical address as the logical address of the display device when the detecting section detects the coupling of the output connector.

Still another aspect of the present disclosure is directed to a control method for a display device included in a plurality of display devices daisy-chain coupled via an input connector of an HDMI standard and an output connector of the HDMI standard, the control method including: detecting whether the output connector is coupled; and deciding a first logical address as a logical address of the display device when the coupling of the output connector is not detected and deciding a second logical address different from the first logical address as the logical address of the display device when the coupling of the output connector is detected.

BRIEF DESCRIPTION OF THE DRAWINGS

FIG. 9 is a sequence chart showing start processing of the display system.

FIG. 10 is a sequence chart showing start processing of the display system.

DESCRIPTION OF EXEMPLARY EMBODIMENTS

An embodiment is explained below with reference to the drawings.

Figure 1:
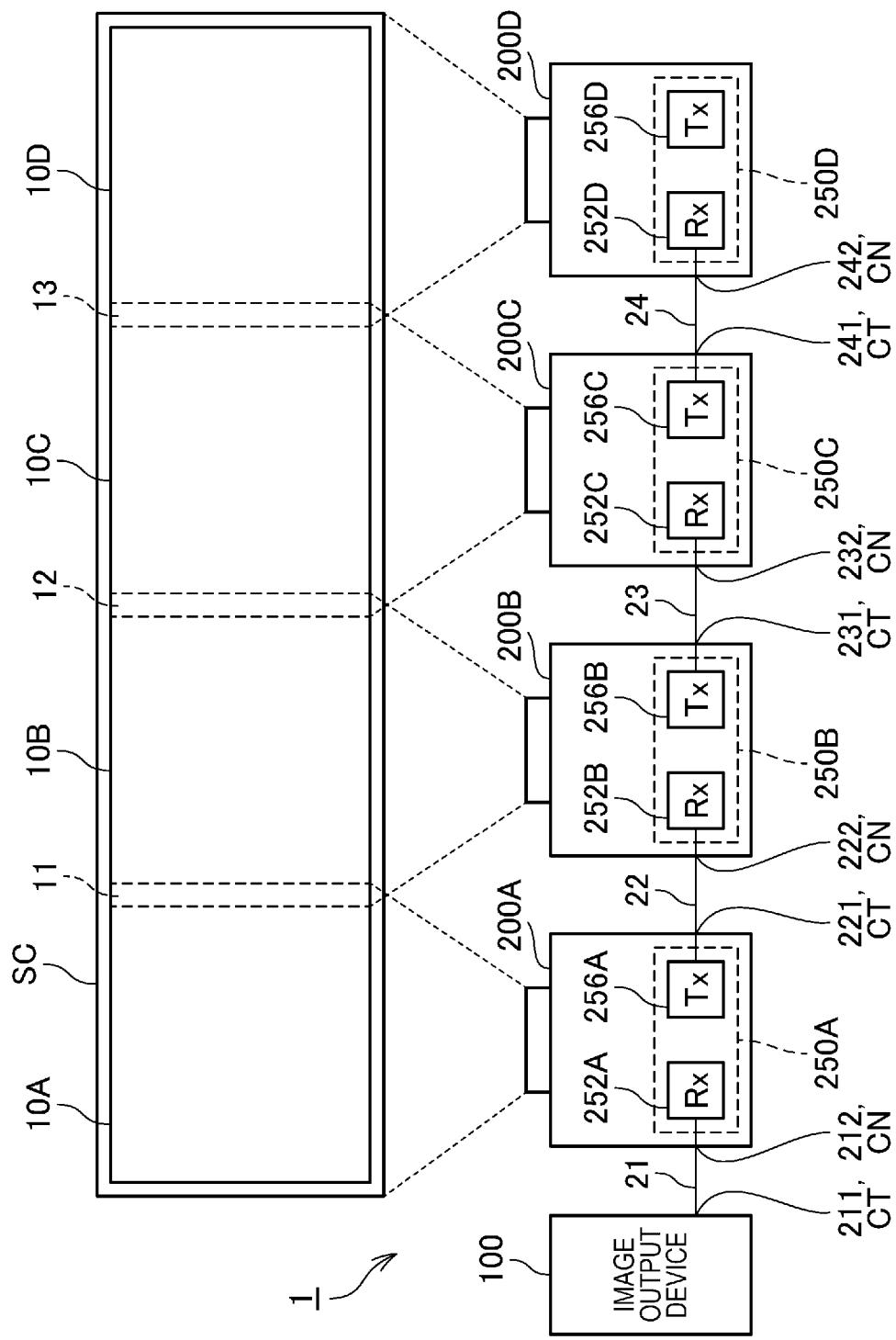
FIG. 1 is a configuration diagram showing the configuration of a display system.

FIG. 1 is a configuration diagram showing the configuration of a display system 1.

The display system 1 in this embodiment includes an image output device 100 and a plurality of projectors 200. In FIG. 1, as the plurality of projectors 200, four projectors 200A, 200B, 200C, and 200D are shown. The number of projectors 200 configuring the display system 1 is not limited to four. The number of projectors 200 only has to be two or more.

The projectors 200A to 200D have the same configuration.

The projectors 200A to 200D are equivalent to an example of "a plurality of display devices". Each of the projectors 200A to 200D is equivalent to an example of a "display device".

In the following explanation, when it is unnecessary to particularly distinguish the projectors 200A to 200D, the projectors 200A to 200D are sometimes described as projectors 200.

The image output device 100 is coupled to the projector 200A. The image output device 100 supplies an HDMI (High-Definition Multimedia Interface) (registered trademark) signal to the projector 200A. The HDMI signal includes image data and sound data. The image data may be image data of a moving image or may be image data of a still image. The sound data may be monaural sound data or may be stereo sound data. The sound data may be a sound data of a surround scheme in which sound channels more than sound channels of stereo are used.

As the image output device 100, for example, a notebook PC (Personal Computer), a desktop PC, a tablet terminal, a smartphone, and a PDA (Personal Digital Assistance) can be used. As the image output device 100, a video reproduction device, a DVD (Digital Versatile Disk) player, a Blue-ray disk player, a hard disk recorder, a television tuner device, a set-top box of a CATV (Cable television), a video game machine, or the like may be used.

Figure 2:
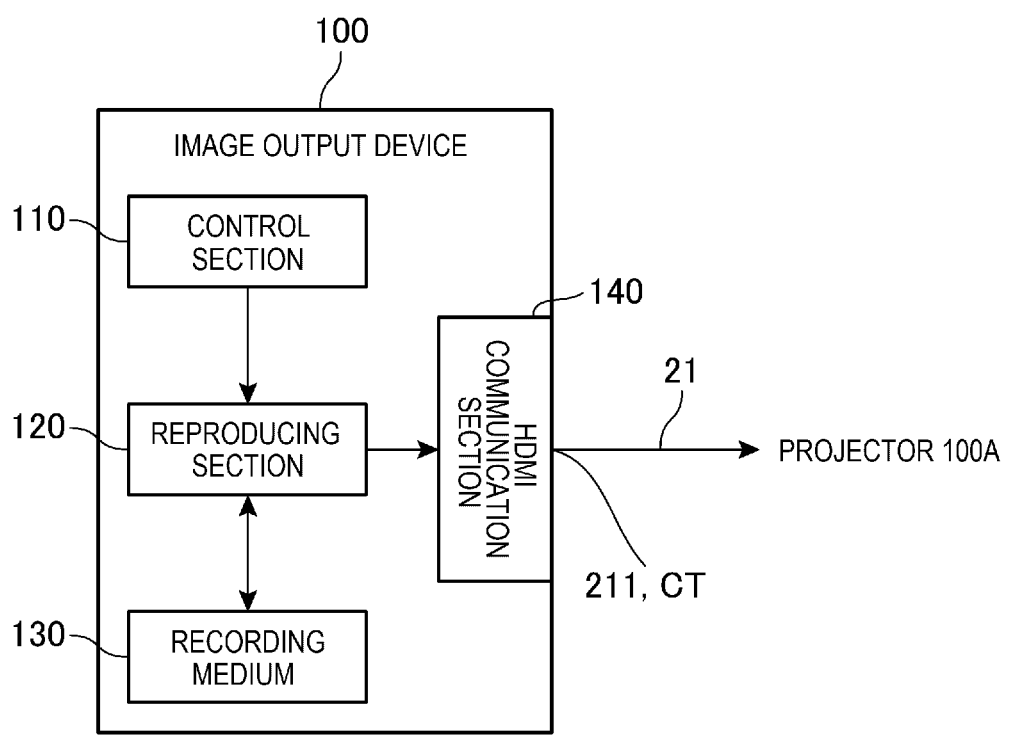
FIG. 2 is a configuration diagram showing the configuration of an image output device.

FIG. 2 is a configuration diagram showing the configuration of the image output device 100.

The image output device 100 includes a control section 110, a reproducing section 120, a recording medium 130, and an HDMI (registered trademark) communication section 140.

The control section 110 controls the image output device 100. The recording medium 130 is configured by a DVD, a Blu-ray (registered trademark) disk, or the like and stores image data, sound data, and the like of content. The reproducing section 120 reproduces the content recorded in the recording medium 130 according to the control by the control section 110. The reproducing section 120 outputs the image data and the sound data of the reproduced content to the HDMI communication section 140.

The HDMI communication section 140 converts the image data and the sound data input from the reproducing section 120 into an HDMI signal of a predetermined transmission format according to the control by the control section 110. The HDMI communication section 140 outputs the HDMI signal to an HDMI cable 21 according to the control by the control section 110.

The reproducing section 120 may reproduce contents stored in a semiconductor storage device such as a flash memory, a magnetic storage device such as a HDD (Hard Disk Drive), and a magneto-optical storage device. The reproducing section 120 may reproduce content downloaded from a server device on a network.

As shown in FIG. 1, the image output device 100 and the projector 200A are coupled by the HDMI cable 21. An output connector 211 and an input connector 212 are disposed at both ends of the HDMI cable 21.

One end portion of the HDMI cable 21 is coupled to the HDMI communication section 140 of the image output device 100 via the output connector 211. The other end portion of the HDMI cable 21 is coupled to an HDMI communication section 250A of the projector 200A via the input connector 212.

The projectors 200A to 200D are daisy-chain coupled by an HDMI cable 22, an HDMI cable 23, and an HDMI cable 24. In other words, the projectors 200A to 200D are coupled in series by the HDMI cables 22, 23, and 24.

Specifically, the projectors 200A, 200B, 200C, and 200D are coupled as explained below.

That is, the projector 200A and the projector 200B are coupled by the HDMI cable 22. An output connector 221 and an input connector 222 are disposed at both ends of the HDMI cable 22. The projector 200B and the projector 200C are coupled by the HDMI cable 23. An output connector 231 and an input connector 232 are disposed at both ends of the HDMI cable 23. The projector 200C and the projector 200D are coupled by the HDMI cable 24. An output connector 241 and an input connector 242 are disposed at both ends of the HDMI cable 24.

The projector 200A includes an HDMI communication section 250A. The HDMI communication section 250A includes an HDMI receiving section 252A and an HDMI transmitting section 256A. In FIG. 1, the HDMI receiving section is described as "Rx" and the HDMI transmitting section is described as "Tx".

The HDMI receiving section 252A is coupled to the image output device 100 by the HDMI cable 21 via the input connector 212. The HDMI transmitting section 256A is coupled to the projector 200B by the HDMI cable 22 via the output connector 221.

The HDMI receiving section 252A of the projector 200A receives an HDMI signal transmitted from the image output device 100. The projector 200A captures the received HDMI signal and executes processing such as image processing and sound processing. The HDMI transmitting section 256A of the projector 200A transmits the HDMI signal to the projector 200B.

The projector 200B includes an HDMI communication section 250B. The HDMI communication section 250B includes an HDMI receiving section 252B and an HDMI transmitting section 256B. The HDMI receiving section 252B is coupled to the projector 200A by the HDMI cable 22 via the input connector 222. The HDMI transmitting section 256B is coupled to the projector 200C by the HDMI cable 23 via the output connector 231.

The HDMI receiving section 252B of the projector 200B receives the HDMI signal transmitted from the projector 200A. The projector 200B captures the received HDMI signal and executes processing such as image processing and sound processing. The HDMI transmitting section 256B of the projector 200B transmits the HDMI signal to the projector 200C.

The projector 200C includes an HDMI communication section 250C. The HDMI communication section 250C includes an HDMI receiving section 252C and an HDMI transmitting section 256C. The HDMI receiving section 252C is coupled to the projector 200B by the HDMI cable 23 via the input connector 232. The HDMI transmitting section 256C is coupled to the projector 200D by the HDMI cable 24 via the output connector 241.

The HDMI receiving section 252C of the projector 200C receives the HDMI signal transmitted from the projector 200B. The projector 200C captures the received HDMI signal and executes processing such as image processing and sound processing. The HDMI transmitting section 256C of the projector 200C transmits the HDMI signal to the projector 200D.

The projector 200D includes an HDMI communication section 250D. The HDMI communication section 250D includes an HDMI receiving section 252D and an HDMI transmitting section 256D. The HDMI receiving section 252D is coupled to the projector 200C by the HDMI cable 24 via the input connector 242.

The HDMI receiving section 252D of the projector 200D receives the HDMI signal transmitted from the projector 200C. The projector 200D captures the received HDMI signal and executes processing such as image processing and sound processing.

In this embodiment, each of the input connector 212, the input connector 222, the input connector 232, and the input connector 242 is sometimes described as input connector CN. Each of the output connector 211, the output connector 221, the output connector 231, and the output connector 241 is sometimes described as output connector CT.

Each of the HDMI cables 21, 22, 23, and 24 includes a data line for transmission of image data, sound data, and control information. The data line is three data lines of TMDS (Transition Minimized Differential Signaling) channels #0, #1, and #2. These data lines are data lines for serially transmitting an HDMI signal, which is a differential signal, in one direction. Besides, each of the HDMI cables 21, 22, 23, and 24 includes a CEC (Consumer Electronic Control) line and a DDC (Display Data Channel) line. The CEC line is a signal line for bidirectionally communicating data for control between devices coupled to an HDMI cable. The DDC line is two signal lines used for readout of E-EDID (Enhanced Extended Display Identification Data). The E-EDID is device information for specifying a sink device, which is a device on a receiving side of supply of the HDMI signal.

In FIG. 1, the projectors 200A to 200D are disposed in a row in the lateral direction. The projectors 200 project images on a screen SC side by side. The projector 200A projects the image on a projection region 10A of the screen SC. The projector 200B projects the image on a projection region 10B of the screen SC. The projector 200C projects the image on a projection region 10C of the screen SC. The projector 200D projects the image on a projection region 10D of the screen SC.

The display system 1 performs tiling projection for combining the images projected by the projectors 200A to 200D on the screen SC and projecting one large-screen image on the screen SC. That is, in the timing projection, the projectors 200 adjacent to each other are disposed such that images projected by projecting sections 210 are combined on the screen SC.

In the tiling projection, the projector 200 projects an image such that an edge of the projected image overlaps an edge of an image projected by the projector 200 adjacent to the projector 200. This is to make a boundary of the projected images less conspicuous. For example, edges of an image projected by the projector 200A and an image projected by the projector 200B located on the right side of the projector 200A overlap to form a superimposed region 11. Similarly, edges of the image projected by the projector 200B and an image projected by the projector 200C located on the right side of the projector 200B overlap to form a superimposed region 12. Similarly, edges of the image projected by the projector 200C and an image projected by the projector 200D located on the right side of the projector 200C overlap to form a superimposed region 13.

In this embodiment, an example is explained in which a projection target on which the projectors 200A to 200D project images is the screen SC. However, the projection target is not limited to the screen SC. The projection target may be a uniform plane or may be a curved surface, a discontinuous surface, a surface having unevenness, or the like. Specifically, a wall surface of a building and a surface of an object can be used as the projection target.

A setting method for the projectors 200A to 200D is not limited to flat placing. The setting method can be ceiling suspension setting for suspending the projectors 200A to 200D from a ceiling or wall hanging setting for hanging the projectors 200A to 200D on a wall surface.

In FIG. 1, the projectors 200A to 200D are laterally disposed side by side in a row. However, the projectors 200A to 200D may be longitudinally disposed side by side in a row. The projectors 200A to 200D may be disposed side by in two rows and two columns.

Figure 3:
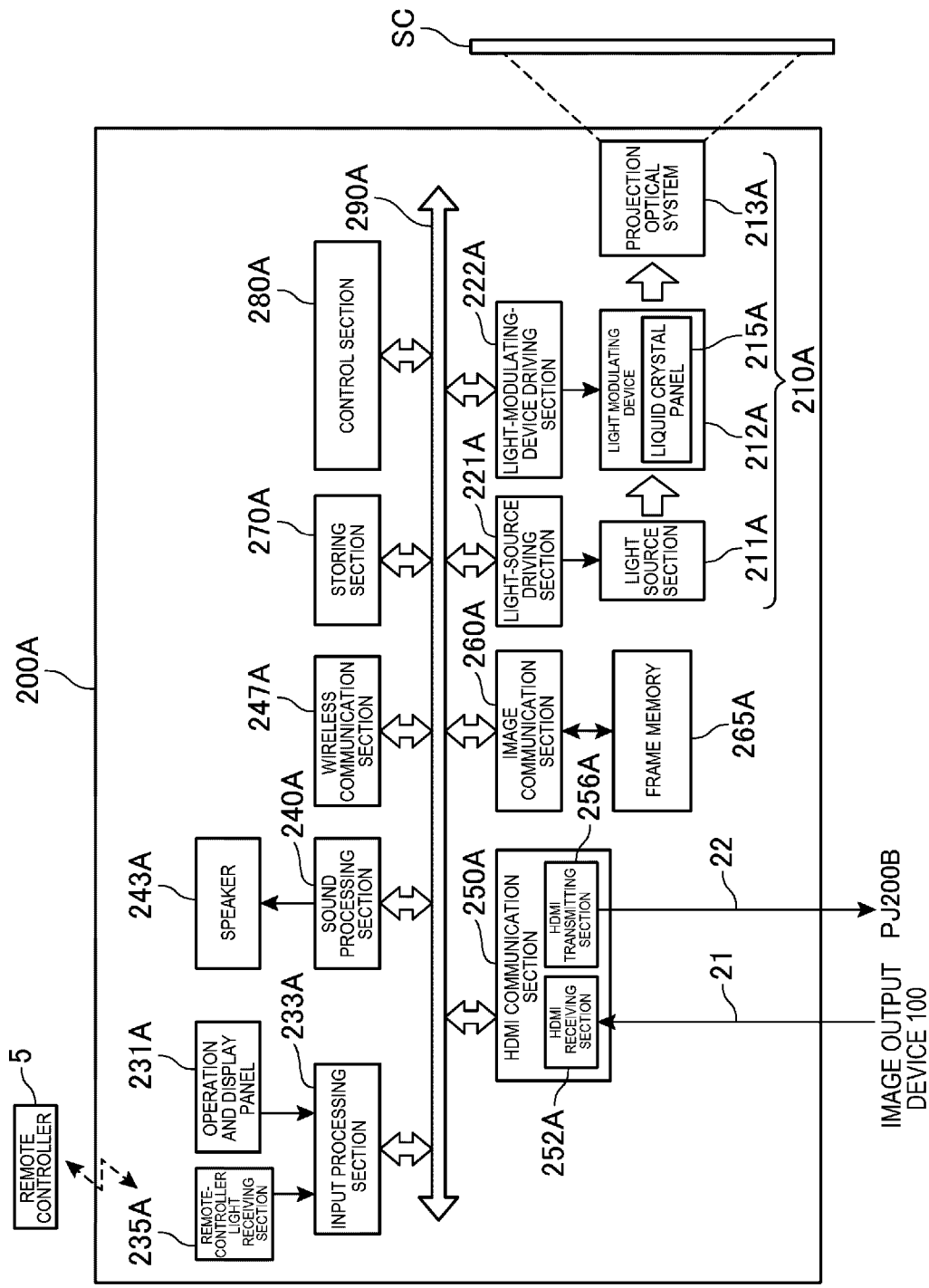
FIG. 3 is a configuration diagram showing the configuration of a projector.

FIG. 3 is a configuration diagram showing the configuration of the projector 200A. The configurations of the projectors 200A to 200D are the same. Therefore, in the following explanation, the configuration of the projector 200A is explained. Explanation concerning the configurations of the projectors 200B to 200D is omitted.

In the following explanation, in order to distinguish the components of the projectors 200, signs with "A" are attached to the components of the projector 200A and signs with "B" are attached to the components of the projector 200B. Similarly, signs with "C" are attached to the components of the projector 200C and signs with "D" are attached to the components of the projector 200D.

For example, the control section of the projector 200A is described as control section 280A and the control section of the projector 200B is described as control section 280B. Similarly, the control section of the projector 200C is described as control section 280C and the control section of the projector 200D is described as control section 280D.

The HDMI communication section 250A of the projector 200A includes an HDMI receiving section 252A and an HDMI transmitting section 256A.

The HDMI receiving section 252A includes a coupling terminal coupled to the input connector 212 of the HDMI cable 21 and an interface circuit that processes a received HDMI signal and converts the HDMI signal into image data, sound data, and control information.

The HDMI transmitting section 256A includes a coupling terminal coupled to the output connector 221 of the HDMI cable 22 and an interface circuit that converts image data, sound data, and control information into an HDMI signal.

The projector 200A includes a projecting section 210A that performs formation of an optical image and projects the image on the screen SC. The projecting section 210A includes a light source section 211A, a light modulating device 212A, and a projection optical system 213A. The projecting section 210A is equivalent to an example of a "display section".

The light source section 211A includes a light source formed by a Xenon lamp, an ultra-high pressure mercury lamp, an LED (Light Emitting Diode), a laser beam source, or the like. The light source section 211A may include a reflector and an auxiliary reflector that guide light emitted by the light source to the light modulating device 212A. Further, the light source section 211A may include a lens group and a polarizing plate for improving an optical characteristic of projected light or a dimming element that reduces a light amount of the light emitted by the light source on a path leading to the light modulating device 212A.

The light source section 211A is driven by a light-source driving section 221A. The light-source driving section 221A is coupled to an internal bus 290A. The light-source driving section 221A lights and extinguishes the light source of the light source section 211A according to control by the control section 280A also coupled to the internal bus 290A.

The light modulating device 212A includes, for example, three liquid crystal panels 215A corresponding to the three primary colors of R, G, and B. R indicates red, G indicates green, and B indicates blue. That is, the light modulating device 212A includes a liquid crystal panel 215A corresponding to R color light, a liquid crystal panel 215A corresponding to G color light, and a liquid crystal panel 215A corresponding to B color light.

Light emitted by the light source section 211A is separated into color lights of three colors of RGB. The color lights are respectively made incident on the liquid crystal panels 215A corresponding to the color lights. Each of the three liquid crystal panels 215A is a transmissive liquid crystal panel and modulates transmitted light to generate image light. Image lights transmitted through the liquid crystal panels 215A and modulated are combined by a combination optical system such as a cross dichroic prism and emitted to the projection optical system 213A.

The light modulating device 212A is driven by a light-modulating-device driving section 222A. The light-modulating-device driving section 222A is coupled to the internal bus 290A.

Image data corresponding to the primary colors of R, G, and B is input to the light-modulating-device driving section 222A from an image processing section 260A. The light-modulating-device driving section 222A converts the input image data into a data signal suitable for the operation of the liquid crystal panel 215A. The light-modulating device driving section 222A applies voltages to pixels of the liquid crystal panels 215A based on the converted data signal and draws images on the liquid crystal panels 215A.

The projection optical system 213A includes a lens group that projects the image light modulated by the light modulating device 212A on the screen SC and forms an image on the screen SC. The projection optical system 213A may include a zoom mechanism that enlarges or reduces an image projected on the screen SC and a focus adjusting mechanism that performs adjustment of a focus.

The projector 200A includes an operation panel 231A, a remote-controller light receiving section 235A, and an input processing section 233A. The operation panel 231A and the remote-controller light receiving section 235A are couple to the input processing section 233A coupled to the internal bus 290A.

Various operation keys for operating the projector 200A are provided on the operation panel 231A. For example, a power supply key for instructing power-on or power-off of the projector 200A and a menu key for performing various kinds of setting are provided on the operation panel 231A. When the operation key is operated, the input processing section 233A outputs an operation signal corresponding to the operated key to the control section 280A.

The projector 200A includes a remote controller 5 used by a user. The remote controller 5 includes various buttons and transmits an infrared signal according to operation of the buttons.

The remote-controller light receiving section 235A receives the infrared signal transmitted from the remote controller 5. The input processing section 233A decodes the infrared signal received by the remote-controller light receiving section 235A, generates an operation signal indicating operation content in the remote controller 5, and outputs the operation signal to the control section 280A.

The projector 200A includes a sound processing section 240A and a speaker 243A.

The sound processing section 240A applies signal processing such as decryption, D/A conversion, and amplification to sound data, converts the sound data into an analog sound signal, and outputs the analog sound signal to the speaker 243A.

The projector 200A includes a wireless communication section 247A. The wireless communication section 247A is coupled to the internal bus 290A and operates according to the control by the control section 280A.

The wireless communication section 247A includes an antenna and an RF (Radio Frequency) circuit not shown in FIG. 3 and executes wireless communication between the wireless communication section 247A and an external device under the control by the control section 280A. As a wireless communication scheme of the wireless communication section 247A, for example, a short-range wireless communication scheme such as a wireless LAN (Local Area Network), Bluetooth (registered trademark), UWB (Ultra Wide Band), or infrared communication can be adopted. As the wireless communication scheme of the wireless communication section 247A, a wireless communication system using a cellular phone line can be adopted.

The projector 200A includes an image processing system. The image processing system is configured mainly from the control section 280A that integrally controls the entire projector 200A. Besides, the image processing system includes an image processing section 260A, a frame memory 265A, and a storing section 270A. The control section 280A, the image processing section 260A, and the storing section 270A are coupled by the internal bus 290A to be capable of performing data communication with one another.

The image processing section 260A develops image data received from the image output device 100 on the frame memory 265A and processes the image data. The processing performed by the image processing section 260A includes, for example, resolution conversion processing, resize processing, shape correction processing such as distortion correction, digital zoom processing, color tone correction processing, and luminance correction processing. The image processing section 260A executes processing designated by the control section 280A and, according to necessity, performs the processing using parameters input from the control section 280A. Naturally, the image processing section 260A is also capable of executing a plurality of kinds of processing among the kinds of processing described above in combination. The image processing section 260A reads out, from the frame memory 265A, image data for which the processing ends and outputs the image data to the light-modulating-device driving section 222A.

The storing section 270A is an auxiliary storage device such as a hard disk device. The storing section 270A may be substituted by a DRAM (Dynamic RAM), a flash memory capable of storing a large volume of information, or an optical disk such as a CD (Compact Disc), a DVD (Digital Versatile Disc), or a BD (Blu-ray Disc). The storing section 270A stores control programs executed by the control section 280A and various data.

The storing section 270A stores identification information of each of the projectors 200A to 200D. The same applies to storing sections 270B, 270C, and 270D. The user may input the identification information of the projectors 200 by operating the operation panel 231A. Device information of the projectors 200 read out from the E-EDID via the DDC line may be used as the identification information.

The control section 280A controls the sections of the projector 200. The control section 280A includes, as hardware, a processor such as a CPU (Central Processing Unit), a ROM (Read Only Memory), a RAM (Random Access Memory), and other peripheral circuits.

The ROM is a nonvolatile storage device such as a flash ROM and stores control programs and data. The RAM is used as a work area used by the CPU when performing arithmetic processing. The processor develops the control programs read out from the ROM and the storing section 270A on the RAM and executes the developed control programs to control the sections of the projector 200A. The configuration of the control section 280A is explained in detail below with reference to FIG. 4.

Figure 4:
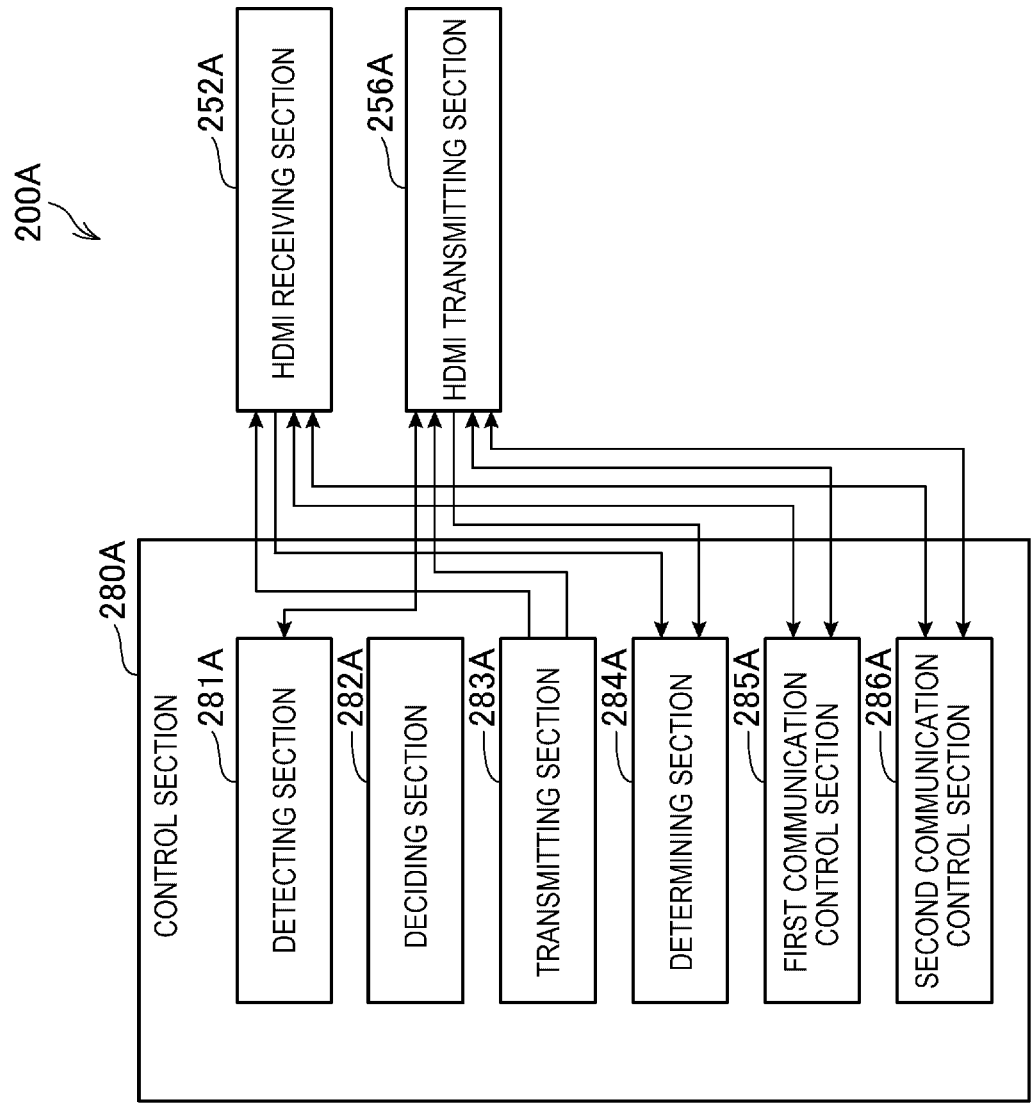
FIG. 4 is a configuration diagram showing the configuration of a control section of the projector.

FIG. 4 is a configuration diagram showing the configuration of the control section 280A of the projector 200A. The configurations of the control sections 280A to 280D are the same. Therefore, the configuration of the control section 280A is explained. Explanation concerning the control sections 280B to 280D is omitted.

The control sections 280A includes a detecting section 281A, a deciding section 282A, a transmitting section 283A, a determining section 284A, a first communication control section 285A, and a second communication control section 286A.

Specifically, the processor of the control section 280A executes the control programs read out from the ROM and the storing section 270A to thereby function as the detecting section 281A, the deciding section 282A, the transmitting section 283A, the determining section 284A, the first communication control section 285A, and the second communication control section 286A.

The first communication control section 285A and the second communication control section 286A need to be explained without being limited to the control section 280A of the projector 200A. Therefore, each of a first communication control section 285 and a second communication control section 286 is explained.

The first communication control section 285 indicates each of first communication control sections 285A to 285D. The second communication control section 286 indicates each of second communication control sections 286A to 286D.

The detecting section 281A detects whether the output connector CT is coupled.

Specifically, the detecting section 281A detects whether the output connector 221 of the HDMI cable 22 is coupled to the HDMI transmitting section 256A.

When the output connector 221 of the HDMI cable 22 is coupled to the HDMI transmitting section 256A, the projector 200A and the projector 200B are coupled via the HDMI cable 22.

When the detecting section 281A does not detect that the output connector CT is coupled, the deciding section 282A decides a first logical address LA1 as a logical address LA of the projector 200A.

The first logical address LA1 indicates the projector 200 disposed on the most downstream side among the projectors 200A to 200D. The "most downstream side" means a side most away from the image output device 100. In this embodiment, the first logical address LA1 is decided as the logical address LA of the projector 200D.

When the detecting section 281A detects that the output connector CT is coupled, the deciding section 282A decides a second logical address LA2 as the logical address LA of the projector 200A.

The second logical address LA2 indicates the projector 200 not on the most downstream side among the projectors 200A to 200D. In this embodiment, the second logical address LA2 is decided as the logical address LA of each of the projectors 200A to 200C.

The logical address LA, the first logical address LA1, and the second logical address LA2 are explained in detail below with reference to FIG. 5.

When the detecting section 281A does not detect that the output connector 221 is coupled, the transmitting section 283A transmits polling having the first logical address LA1 as a destination.

Specifically, when the detecting section 281A does not detect that the output connector 221 is coupled, the transmitting section 283A transmits, via the HDMI receiving section 252A and the HDMI transmitting section 256A, the polling having the first logical address LA1 as the destination to devices coupled to the projector 200A. In this embodiment, the devices coupled to the projector 200A are the image output device 100 and the projector 200B.

The determining section 284A determines whether an affirmative response to the polling is received.

Specifically, the determining section 284A determines whether an affirmative response to the polling is received via the HDMI receiving section 252A and the HDMI transmitting section 256A.

The reception of the affirmative response to the polling means that the projector 200, the logical address LA of which is the first logical address LA1, is coupled.

When the determining section 284A determines that the affirmative response is received, the deciding section 282A decides the second logical address LA2 as the logical address LA of the projector 200A.

That is, among the projectors 200A to 200D, the projector 200, the logical address LA of which is the first logical address LA1, is limited to one.

When the logical address LA of the projector 200 is the first logical address LA1, the first communication control section 285 communicates with the image output device 100 using a CEC command CM1 via an HDMI receiving section 252.

Specifically, in the projector 200D having the first logical address LA1, the first communication control section 285D communicates with the image output device 100 using the CEC command CM1 via the HDMI receiving section 252D.

When the logical address LA of the projector 200 is the second logical address LA2, the second communication control section 286 communicates with the projector 200 having the first logical address LA1 using a specific command CM2 for identifying a destination based on information other than the logical address LA.

In this embodiment, the specific command is a vendor command having identification information indicating a destination. That is, "the information other than the logical address LA" is, for example, "identification information". The identification information of each of the projectors 200A to 200D is stored in a storing section 270. The "vendor command" is a command that a vendor can define.

Specifically, in the projectors 200A to 200C having the second logical address LA2, each of second communication control sections 286A to 286C communicates with the projector 200D having the first logical address LA1 using the specific command CM2.

When the logical address LA of the projector 200 is the first logical address LA1, the second communication control section 286 communicates with the other projectors 200, logical addresses of which are the second logical address LA2, among the projectors 200A to 200D using the specific command CM2. The other projectors 200 are, for example, the projector 200B and the projector 200C.

Specifically, the second communication control section 286D of the projector 200D having the first logical address LA1 communicates with each of the projectors 200A to 200C having the second logical address LA2 using the specific command CM2.

The configuration of each of the first communication control section 285 and the second communication control section 286 is explained in detail below with reference to FIGS. 8 to 10.

Figure 5:
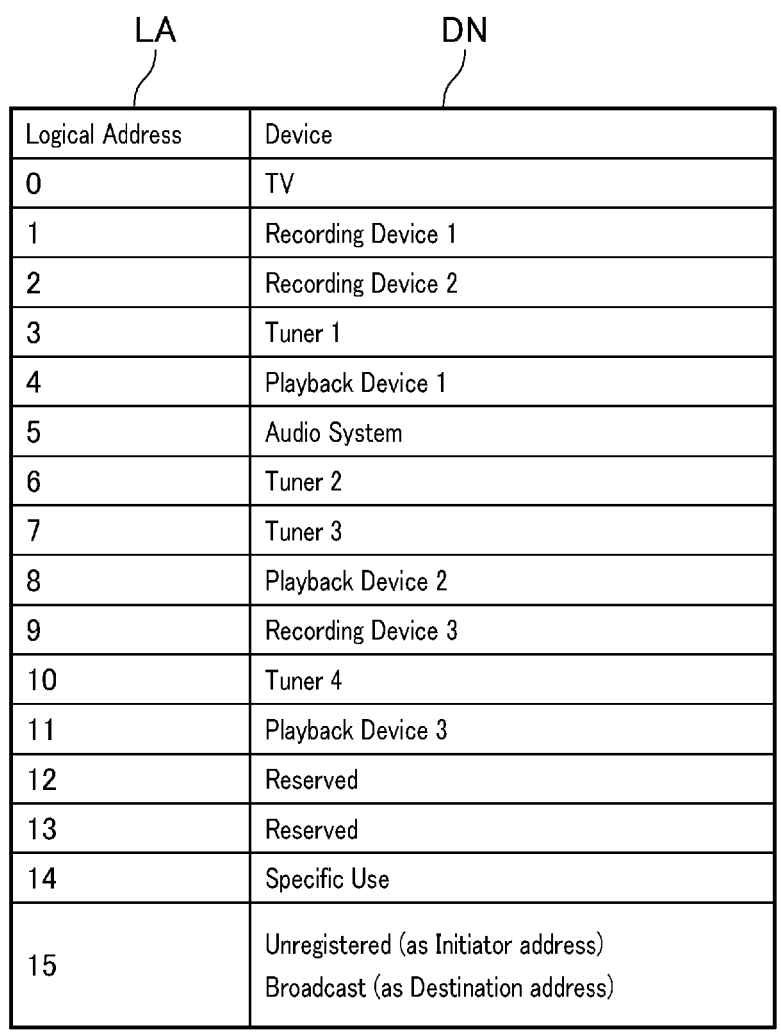
FIG. 5 is a diagram showing a relation between a logical address and a type of a device.

FIG. 5 is a diagram showing a relation between the logical address LA decided by the CEC standard and a type DN of a device.

As shown in FIG. 5, "0" is allocated to a device, the type DN of which is "TV", as the logical address LA. The device, the type DN of which is "TV", is a device that displays an image and includes the projector 200. The device, the type DN of which is "TV", is specified as one device in a network that performs CEC communication.

In this embodiment, since the display system 1 includes the four projectors 200, as explained below with reference to FIGS. 6 and 7, the logical addresses LA are allocated to the projectors 200 as explained below. That is, "0" is allocated to the projector 200D as the logical address LA and "15" is allocated to the projectors 200A to 200C as the logical address LA. The logical address LA "15" indicates a device, the type DN of which is not specified.

The first logical address LA1 corresponds to the logical address LA "0". The second logical address LA2 corresponds to the logical address LA "15".

"4", "8", or "11" is allocated to a device, the type DN of which is "Playback Device", as the logical address LA. The device, the type DN of which is "Playback Device", is a device that outputs image data. The device includes the image output device 100.

In this embodiment, for example, the logical address LA "4" is allocated to the image output device 100.

Figure 6:
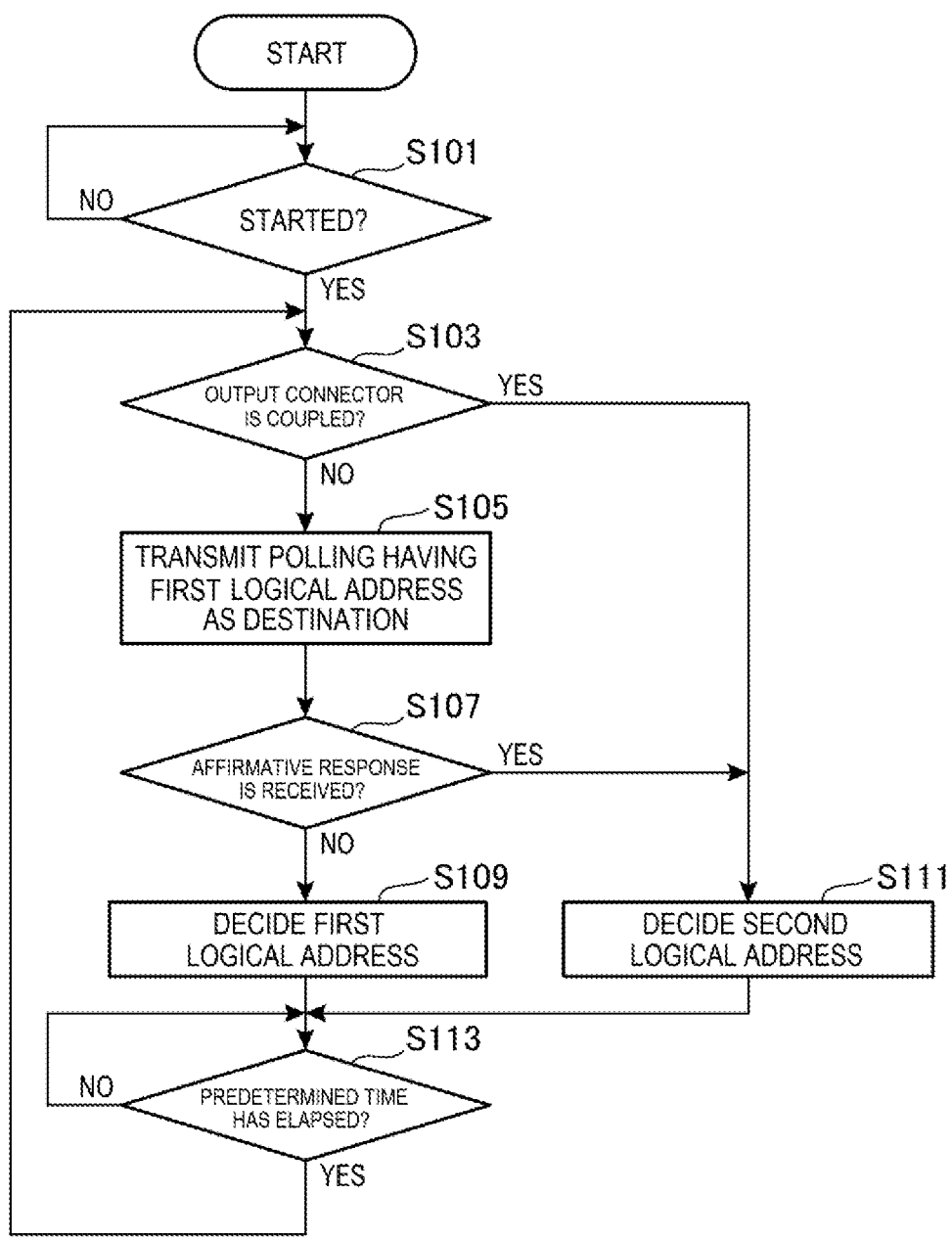
FIG. 6 is a flowchart showing processing of the projector.

FIG. 6 is a flowchart showing processing of the control section 280 in the projectors 200A to 200D.

First, in step S101, the control section 280 determines whether the projector 200 is started.

When the control section 280 determines that the projector 200 is not started (NO in step S101), the processing comes into a standby state. When the control section 280 determines that the projector 200 is started (YES in step S101), the processing proceeds to step S103.

In step S103, a detecting section 281 determines whether the output connector 221 is coupled.

When the detecting section 281 determines that the output connector 221 is coupled (YES in step S103), the processing proceeds to step S111.

In step S111, a deciding section 282 decides the second logical address LA2 as the logical address LA of the projector 200. The processing proceeds to step S113.

When the detecting section 281 determines that the output connector 221 is not coupled (NO in step S103), the processing proceeds to step S105.

In step S105, a transmitting section 283 transmits polling having the first logical address LA1 as a destination.

Subsequently, in step S107, a determining section 284 determines whether an affirmative response to the polling is received.

When the determining section 284 determines that the affirmative response to the polling is received (YES in step S107), the processing proceeds to step S111.

In step S111, the deciding section 282 decides the second logical address LA2 as the logical address LA of the projector 200. The processing proceeds to step S113.

When the determining section 284 determines that the affirmative response to the polling is not received (NO in step S107), the processing proceeds to step S109.

In step S109, the deciding section 282 decides the first logical address LA1 as the logical address LA of the projector 200. The processing proceeds to step S113.

Subsequently, in step S113, the control section 280 determines whether a predetermined time TP has elapsed. The predetermined time TP is, for example, 100 msec.

When the control section 280 determines that the predetermined time TP has not elapsed (NO in step S113), the processing comes into the standby state. When the control section 280 determines that the predetermined time TP has elapsed (YES in step S113), the processing returns to step S103.

Step S103 is equivalent to an example of a "detecting step". Steps S109 and S111 are equivalent to an example of a "deciding step".

Figure 7:
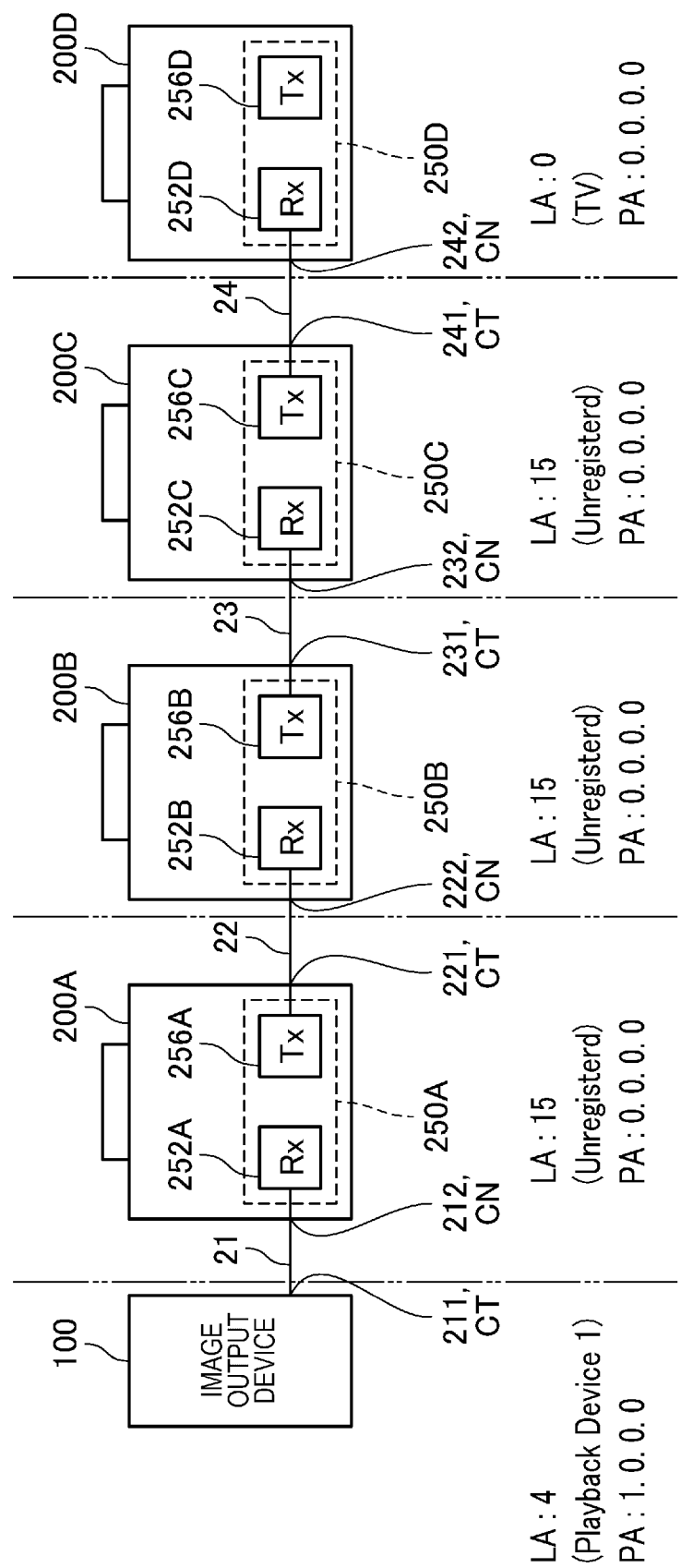
FIG. 7 is a diagram showing logical addresses of an image output device and projectors.

FIG. 7 is a diagram showing the logical addresses LA of the image output device 100 and the projectors 200A to 200D.

The logical addresses LA of the projectors 200A to 200D shown in FIG. 7 are decided by the control section 280 of each of the projectors 200A to 200D executing the flowchart of FIG. 6.

As shown in FIG. 7, "4" is allocated to the image output device 100 as the logical address LA. The logical address LA "4" indicates that the type DN of the device is "Playback Device".

"15" is allocated to each of the projectors 200A to 200C as the logical address LA. The logical address LA "15" indicates a device, the type DN of which is not specified. The logical address LA "15" corresponds to an example of the second logical address LA2.

"0" is allocated to the projector 200D as the logical address LA. The logical address LA "0" indicates that the type DN of the device is "TV". The logical address LA "0" corresponds to an example of the first logical address LA1.

As shown in FIG. 7, for example, "1.0.0.0" is allocated to the image output device 100 as the physical address PA. For example, "0.0.0.0" is allocated to each of the projectors 200A to 200D as a physical address PA.

According to EDID information, a single physical address PA is necessary in all devices on a downstream side of the image output device 100. Therefore, the same physical address PA is allocated to each of the projectors 200A to 200D. The downstream side of the image output device 100 indicates a side to which an image is output from the image output device 100.

In this way, the same physical address PA is allocated to each of the projectors 200A to 200D as the physical address PA. Therefore, the projectors 200A to 200D can be regarded as one display device. For example, the four projectors 200A to 200D are daisy-chain coupled to the image output device 100. However, for the image output device 100, one projector having "0" as the logical address LA is recognized. In this way, the four projectors 200A to 200D are recognized by other devices as one projector specified by one kind of the physical address PA and the one logical address "0".

In this embodiment, the same physical address PA is allocated to each of the projectors 200A to 200D as the physical address PA. However, not only this, but the physical addresses PA different from one another may be allocated to all the devices according to the HDMI standard.

For example, the physical address PA of each of the projectors 200A to 200D may be allocated by rewriting EDIDs of the HDMI receiving sections 252A to 252D. In this case, for example, the physical addresses PA are allocated as explained below. That is, "0.0.0.0" is allocated as the physical address PA of the projector 200A. "1.0.0.0" is allocated as the physical address PA of the projector 200B. "2.0.0.0" is allocated as the physical address PA of the projector 200C. "3.0.0.0" is allocated as the physical address PA of the projector 200D.

Figure 8:
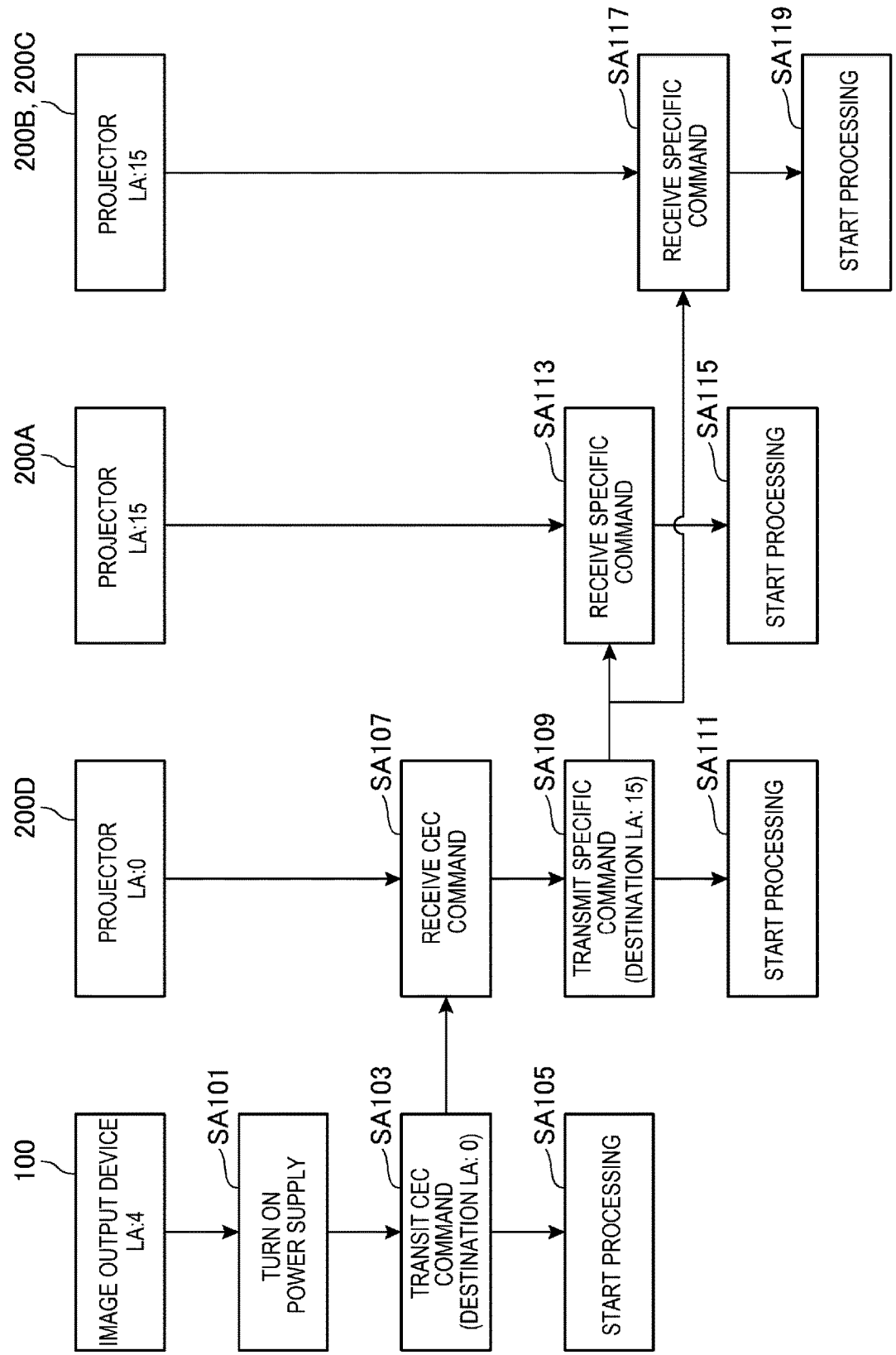
FIG. 8 is a sequence chart showing start processing of the display system.

Each of FIGS. 8 to 10 is a sequence chart showing start processing for the display system 1. FIG. 8 shows start processing for the display system 1 in which a power supply of the image output device 100 is turned on by a user.

As shown in FIG. 8, first, in step SA101, the power supply of the image output device 100 is turned on by the user.

Subsequently, in step SA103, the control section 110 of the image output device 100 transmits the CEC command CM1 for instructing a start to a device, the logical address LA of which is "0". The logical address LA "0" corresponds to the first logical address LA1.

Specifically, the control section 110 of the image output device 100 transmits the CEC command CM1 for instructing a start to the projector 200D having the first logical address LA1.

Subsequently, in step SA105, the control section 110 of the image output device 100 executes the start processing.

In step SA107, the first communication control section 285D of the control section 280D of the projector 200D receives the CEC command CM1 for instructing a start transmitted from the image output device 100.

In step SA109, the second communication control section 286D of the control section 280D of the projector 200D transmits the specific command CM2 for instructing a start to the projectors 200A to 200C. Specifically, the specific command CM2 is a command obtained by adding a parameter for instructing a start to the identification information of each of the projectors 200A to 200C. Note that the identification information of each of the projectors 200A to 200C is read out from the storing section 270D by the second communication control section 286D.

Subsequently, in step SA111, the control section 280D of the projector 200D executes the start processing.

In step SA113, the second communication control section 286A of the control section 280A of the projector 200A receives the specific command CM2 for instructing a start from the projector 200D.

In step SA115, the control section 280A of the projector 200A executes the start processing.

In step SA117, the second communication control section 286 of the control section 280 of each of the projectors 200B and 200C receives the specific command CM2 for instructing a start from the projector 200D.

In step SA119, the control section 280 of each of the projectors 200B and 200C executes the start processing.

In this way, the CEC command CM1 is transmitted from the image output device 100 to the projector 200D. The specific command CM2 is transmitted from the projector 200D to the projectors 200A to 200C. As a result, it is possible to start each of the projectors 200A to 200D according to the turn-on of the power supply of the image output device 100 by the user.

FIG. 9 shows start processing for the display system 1 in which a power supply of the projector 200D is turned on by a user. FIG. 9 is different from FIG. 8 in that, whereas the power supply of the image output device 100 is turned on by the user in FIG. 8, the power supply of the projector 200D is turned on by the user.

As shown in FIG. 9, first, in step SB101, the power supply of the projector 200D is turned on by the user.

Subsequently, in step SB103, the first communication control section 285D of the control section 280D of the projector 200D transmits the CEC command CM1 for instructing a start to a device, the logical address LA of which is "4". The device, the logical address LA of which is "4", corresponds to the image output device 100.

Subsequently, in step SB105, the second communication control section 286D of the control section 280D of the projector 200D transmits the specific command CM2 for instructing a start to the projectors 200A to 200C. Specifically, the specific command CM2 is a command obtained by adding a parameter for instructing a start to the identification information of each of the projectors 200A to 200C. The identification information of each of the projectors 200A to 200C is read out from the storing section 270D by the second communication control section 286D.

Subsequently, in step SB107, the control section 280D of the projector 200D executes the start processing.

In step SB109, the control section 110 of the image output device 100 receives the CEC command CM1 for instructing a start from the projector 200D.

In step SB111, the control section 110 of the image output device 100 executes the start processing.

In step SB113, the second communication control section 286A of the control section 280A of the projector 200A receives the specific command CM2 for instructing a start from the projector 200D.

In step SB115, the control section 280A of the projector 200A executes the start processing.

In step SB117, the second communication control section 286 of the control section 280 of each of the projectors 200B and 200C receives the specific command CM2 for instructing a start from the projector 200D.

In step SB119, the control section 280 of each of the projectors 200B and 200C executes the start processing.

In this way, the CEC command CM1 is transmitted from the projector 200D to the image output device 100. The specific command CM2 is transmitted from the projector 200D to the projectors 200A to 200C. As a result, the image output device 100 and each of the projectors 200A to 200D can be started according to the turn-on of the power supply of the projector 200D by the user.

FIG. 10 is shows start processing for the display system 1 in which a power supply of the projector 200A is turned on by a user. FIG. 10 is different from FIGS. 8 and 9 in that, whereas the power supply of the image output device 100 is turned on by the user in FIG. 8 and the power supply of the projector 200D is turned on by the user in FIG. 9, the power supply of the projector 200A is turned on by the user.

As shown in FIG. 10, first, in step SC101, the power supply of the projector 200A is turned on by the user.

Subsequently, in step SC103, the second communication control section 286D of the control section 280D of the projector 200D transmits the specific command CM2 for instructing a start to the projector 200A. Specifically, the specific command CM2 is a command obtained by adding a parameter for instructing a start to the identification information of the projector 200A. The identification information of the projector 200A is read out from the storing section 270D by the second communication control section 286D.

Subsequently, in step SC105, the second communication control section 286D of the control section 280D of the projector 200D transmits the specific command CM2 for instructing a start to the projectors 200B and 200C. Specifically, the specific command CM2 is a command obtained by adding a parameter for instructing a start to the identification information of each of the projectors 200B and 200C. The identification information of each of the projectors 200B and 200C is read out from the storing section 270D by the second communication control section 286D.

Subsequently, in step SC107, the control section 280D of the projector 200D executes the start processing.

In step SC109, the second communication control section 286D of the control section 280D of the projector 200D receives the specific command CM2 for instructing a start from the projector 200A.

In step SC111, the first communication control section 285D of the control section 280D of the projector 200D transmits the CEC command CM1 for instructing a start to a device, the logical address LA of which is "4". The device, the logical address LA of which is "4", corresponds to the image output device 100.

Subsequently, in step SC113, the control section 280D of the projector 200D executes the start processing.

In step SC115, the control section 110 of the image output device 100 receives the CEC command CM1 for instructing a start from the projector 200D.

In step SC117, the control section 110 of the image output device 100 executes the start processing.

In step SC119, the second communication control section 286 of the control section 280 of each of the projectors 200B and 200C receives the specific command CM2 for instructing a start from the projector 200A.

In step SC121, the control section 280 of each of the projectors 200B and 200C executes the start processing.

In this way, the specific command CM2 is transmitted from the projector 200A to the projector 200D. The specific command CM2 is received by the projector 200D. The CEC command CM1 is transmitted from the projector 200D to the image output device 100. The specific command CM2 is transmitted from the projector 200A to the projectors 200B and 200C. As a result, the image output device 100 and each of the projectors 200A to 200D can be started according to the turn-on of the power supply of the projector 200A by the user.

As explained above, in this embodiment, the detecting section 281 detects whether the output connector CT is coupled. When the detecting section 281 does not detect the coupling of the output connector CT, the deciding section 282 decides the first logical address LA1 as the logical address LA of the projector 200. When the detecting section 281 detects the coupling of the output connector CT, the deciding section 282 decides the second logical address LA2 as the logical address LA of the projector 200.

Accordingly, the logical address LA of each of the plurality of projectors 200 can be appropriately decided. Therefore, when one of the two projectors 200 located at both the ends in the plurality of projectors 200 is coupled to the image output device 100 that outputs image information, communication can be efficiently performed between the image output device 100 and the plurality of projectors 200 using commands.

For example, communication is performed between the image output device 100 and the projector 200 having the first logical address LA1 using the CEC command CM1. Communication is performed between devices described below using the specific command CM2 for identifying a destination based on information other than the logical address LA. That is, communication is performed between the image output device 100 and the projector 200 having the second logical address LA2, between the projector 200 having the first logical address LA1 and the projector 200 having the second logical address LA2, and between the plurality of projectors 200 having the second logical address LA2 using the specific command CM2.

As a result, the projectors 200A to 200D can transmit and receive commands without intervention of a device that performs conversion of addresses and relay of commands. It is possible to suppress deterioration in throughput of the commands.

In this embodiment, when the detecting section 281 does not detect that the output connector CT is coupled, the transmitting section 283 transmits polling having the first logical address LA1 as a destination. The determining section 284 determines whether an affirmative response to the polling is received. When the determining section 284 determines that the affirmative response is received, the deciding section 282 decides the second logical address LA2 as the logical address LA of the projector 200.

Accordingly, it is possible to more appropriately decide the logical address LA of each of the plurality of projectors 200. Therefore, the devices communicate using the CEC command CM1 and the specific command CM2. As a result, it is possible to suppress deterioration in throughput.

In this embodiment, one of the two projectors 200 located at both the ends in the plurality of projectors 200 is coupled to, via the input connector CN, the image output device 100 that outputs image information. When the logical address LA of the projector 200 is the first logical address LA1, the first communication control section 285 communicates with the image output device 100 using the CEC command CM1.

Accordingly, the projector 200 having the first logical address LA1 communicates with the image output device 100 using the CEC command CM1. Therefore, it is possible to suppress deterioration in throughput of commands between the projector 200 having the first logical address LA1 and the image output device 100.

In this embodiment, when the image output device 100 receives start operation, the first communication control section 285 of the projector 200 having the first logical address LA1 receives the CEC command CM1 for instructing a start from the image output device 100.

Therefore, when the image output device 100 receives the start operation, the image output device 100 can start the projector 200 having the first logical address LA1.

In this embodiment, when the projector 200 having the first logical address LA1 receives the start operation, the first communication control section 285 of the projector 200 transmits the CEC command CM1 for instructing a start to the image output device 100.

Therefore, when the projector 200 having the first logical address LA1 receives the start operation, the projector 200 can start the image output device 100.

In this embodiment, the projector 200 includes the second communication control section 286 that performs communication using the specific command CM2 for identifying a destination based on information other than the logical address LA. When the logical address LA of the projector 200 is the second logical address LA2, the second communication control section 286 communicates with the projector 200 having the first logical address LA1.

Therefore, it is possible to suppress deterioration in throughput of commands between the projector 200 having the second logical address LA2 and the projector 200 having the first logical address LA1.

In this embodiment, the second communication control section 286 of the projector 200 having the second logical address LA2 communicates with another projector 200 having the second logical address LA2 using the specific command CM2.

Therefore, it is possible to suppress deterioration in throughput of commands between the projector 200 having the second logical address LA2 and the other projector 200 having the second logical address LA2.

In this embodiment, when the projector 200 having the second logical address LA2 receives the start operation, the second communication control section 286 of the projector 200 transmits the specific command CM2 for instructing a start to the other projector 200 having the second logical address LA2.

Therefore, when the projector 200 having the second logical address LA2 receives the start operation, the projector 200 can start the other projector 200 having the second logical address LA2.

In this embodiment, when the projector 200 having the first logical address LA1 receives the start operation, the second communication control section 286 of the projector 200 transmits the specific command CM2 for instructing a start to the projector 200 having the second logical address LA2 among the plurality of projectors 200.

Therefore, when the projector 200 having the first logical address LA1 receives the start operation, the projector can start the projector 200 having the second logical address LA2.

In this embodiment, when the first communication control section 285 of the projector 200 having the first logical address LA1 receives the CEC command CM1 for instructing a start from the image output device 100, the second communication control section 286 of the projector 200 transmits the specific command CM2 for instructing a start to the projector 200 having the second logical address LA2.

Therefore, when the image output device 100 receives the start operation, the image output device 100 can start the projector 200 having the second logical address LA2 through the projector 200 having the first logical address LA1.

In this embodiment, when the second communication control section 286 of the projector 200 having the first logical address LA1 receives the specific command CM2 for instructing a start, the first communication control section 285 of the projector 200 transmits the CEC command CM1 for instructing a start to the image output device 100.

Therefore, when the projector 200 having the second logical address LA2 receives the start operation, the projector 200 can start the image output device 100 through the projector 200 having the first logical address LA1.

The embodiment explained above is only an example of an embodiment and does not limit the embodiment and can be a different form.

In this embodiment, for example, the projector 200 is an example of the display device. However, the display device may be a liquid crystal monitor, a liquid crystal television, or the like that displays an image on a liquid crystal display panel. The display device may be a device including a plasma display panel or an organic EL display panel such as an OLED (Organic light-emitting diode) or OEL (Organic Electro Luminescence) display.

In this embodiment, the configuration in which the light modulating device 212A includes the liquid crystal panel 215A is illustrated. However, the liquid crystal panel 215A may be a transmissive liquid crystal panel or may be a reflective liquid crystal panel. The light modulating device 212A may have a configuration including a digital mirror device (DMD) instead of the liquid crystal panel 215A. The light modulating device 212A may have a configuration in which a digital mirror device and a color wheel are combined. As the light modulating device 212A, besides the liquid crystal panel and the DMD, a configuration capable of modulating light emitted by a light source may be adopted.

The functional sections of the projector 200A shown in FIG. 3 and the functional sections of the control section 280A shown in FIG. 4 indicate functional configurations. Specific implementation forms of the functional sections are not particularly limited. That is, hardware individually corresponding to the functional sections do not always need to be implemented. Naturally, it is possible to adopt a configuration in which one processor executes computer programs to realize functions of a plurality of functional sections. In the embodiment, apart of the functions realized by software may be realized by hardware and a part of the functions realized by hardware may be realized by software. Besides, the specific detailed configurations of the other sections of the projector can be optionally changed in a range not departing from the spirit of the present disclosure.

Processing units of the flowchart of FIG. 6 and the sequence charts of FIGS. 8 to 10 are divided according to main processing contents in order to facilitate understanding of the processing of the projector 200 or the display system 1. The embodiment is not limited by a method of the division and names of the processing units shown in the flowchart of FIG. 6 and the sequence charts of FIGS. 8 to 10. According to processing content, the processing of the control section 280 can be divided into a larger number of processing units or can be divided such that one processing unit includes a larger number of kinds of processing. The processing orders of the flowchart and the sequence charts are not limited to the illustrated examples.

A control method for the display device can be realized by causing a computer included in the display device to execute a computer program corresponding to the control method for the display device. The computer program can also be recorded in a computer-readable recording medium. As the recording medium, a magnetic or optical recording medium or a semiconductor memory device can be used. Specifically, examples of the recording medium include portable and stationary recording media such as a flexible disk, a CD-ROM (Compact Disk Read Only Memory), a DVD, a Blu-ray (registered trademark) disc, a magneto-optical disk, a flash memory, and a card-type recording medium. The recording medium may be a nonvolatile storage device such as a RAM, a ROM, or a HDD, which is an internal storage device included in an image display apparatus. It is also possible to realize the control method for the display device by causing a server device or the like to store a computer program corresponding to the control method for the display device and downloading the computer program from the server device to the display device.

What is claimed is:

1. A display device included in a plurality of display devices daisy-chain coupled via an input connector of a High-Definition Multimedia Interface (HDMI) standard and an output connector of the HDMI standard, the display device comprising:
    a display section;
    a detecting section configured to detect whether the output connector is coupled;
    a deciding section configured to decide a logical address of the display device, wherein
    the deciding section decides a first logical address as the logical address of the display device when the detecting section does not detect the coupling of the output connector,
    the deciding section decides a second logical address different from the first logical address as the logical address of the display device when the detecting section detects the coupling of the output connector, and
    one of two display devices located at both ends in the plurality of display devices is coupled to, via the input connector, an image output device that outputs image information; and
    a first communication control section configured to communicate with the image output device using a Consumer Electronic Control (CEC) command when the logical address of the display device is the first logical address.

2. The display device according to claim 1, further comprising:
    a transmitting section configured to transmit polling having the first logical address as a destination when the detecting section does not detect the coupling of the output connector; and
    a determining section configured to determine whether an affirmative response to the polling is received, wherein
    when the determining section determines that the affirmative response is received, the deciding section decides the second logical address as the logical address of the display device.

3. The display device according to claim 1, wherein, when the logical address of the display device is the first logical address and the image output device receives start operation, the first communication control section receives the CEC command for instructing a start from the image output device.

4. The display device according to claim 1, wherein, when the logical address of the display device is the first logical address and the display device receives start operation, the first communication control section transmits the CEC command for instructing a start to the image output device.

5. The display device according to claim 1, further comprising:
    a second communication control section configured to perform communication using a specific command for identifying a destination based on information other than the logical address, wherein
    when the logical address of the display device is the second logical address, the second communication control section communicates with another display device having the first logical address among the plurality of display devices.

6. The display device according to claim 5, wherein, when the logical address of the display device is the second logical address, the second communication control section communicates with another display device, a logical address of which is the second logical address, among the plurality of display devices using the specific command.

7. The display device according to claim 6, wherein, when the logical address of the display device is the second logical address and the display device receives start operation, the second communication control section transmits the specific command for instructing a start to another display device among the plurality of display devices.

8. The display device according to claim 6, wherein, when the logical address of the display device is the first logical address and the display device receives start operation, the second communication control section transmits the specific command for instructing a start to another display device, a logical address of which is the second logical address, among the plurality of display devices.

9. The display device according to claim 6, wherein, when the logical address of the display device is the first logical address and the first communication control section receives the CEC command for instructing a start from the image output device, the second communication control section transmits the specific command for instructing a start to another display device, a logical address of which is the second logical address, among the plurality of display devices.

10. The display device according to claim 6, wherein, when the logical address of the display device is the first logical address and the second communication control section receives the specific command for instructing a start, the first communication control section transmits the CEC command for instructing a start to the image output device.

11. The display device according to claim 1, wherein the display device is a projector.

12. A display system comprising:
a plurality of display devices daisy-chain coupled via an input connector of a High-Definition Multimedia Interface (HDMI) standard and an output connector of the HDMI standard, wherein
each of the plurality of display devices includes:
a display section;
a detecting section configured to detect whether the output connector is coupled; and
a deciding section configured to decide a logical address of the display device,
the deciding section decides a first logical address as the logical address of the display device when the detecting section does not detect the coupling of the output connector,
the deciding section decides a second logical address different from the first logical address as the logical address of the display device when the detecting section detects the coupling of the output connector,
one of two display devices located at both ends in the plurality of display devices is coupled to, via the input connector, an image output device that outputs image information; and
each of the plurality of display devices further comprises a first communication control section configured to communicate with the image output device using a Consumer Electronic Control (CEC) command when the logical address of the display device is the first logical address.

13. A control method for a display device included in a plurality of display devices daisy-chain coupled via an input connector of a High-Definition Multimedia Interface (HDMI) standard and an output connector of the HDMI standard, the control method comprising:
detecting whether the output connector is coupled;
deciding a first logical address as a logical address of the display device when the coupling of the output connector is not detected and deciding a second logical address different from the first logical address as the logical address of the display device when the coupling of the output connector is detected, wherein
one of two display devices located at both ends in the plurality of display devices is coupled to, via the input connector, an image output device that outputs image information; and
communicating with the image output device using a Consumer Electronic Control (CEC) command when the logical address of the display device is the first logical address.

\* \* \* \* \*